(12) United States Patent
Robertson, Jr. et al.

(10) Patent No.: US 11,548,658 B2
(45) Date of Patent: Jan. 10, 2023

(54) VEHICLE MOONROOF SYSTEMS FOR DOCKING AND COOLING UNMANNED AERIAL VEHICLES

(71) Applicant: FORD GLOBAL TECHNOLOGIES, LLC, Dearborn, MI (US)

(72) Inventors: Michael Robertson, Jr., Garden City, MI (US); Segundo Baldovino, Novi, MI (US); Venkatesh Krishnan, Canton, MI (US); Raghuraman Surineedi, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 615 days.

(21) Appl. No.: 16/665,323

(22) Filed: Oct. 28, 2019

(65) Prior Publication Data

US 2021/0122497 A1    Apr. 29, 2021

(51) Int. Cl.
| | |
|---|---|
| *B64F 1/36* | (2017.01) |
| *B60J 7/043* | (2006.01) |
| *B64F 1/22* | (2006.01) |
| *B60L 53/57* | (2019.01) |

(52) U.S. Cl.
CPC .............. *B64F 1/364* (2013.01); *B60J 7/043* (2013.01); *B60L 53/57* (2019.02); *B64F 1/222* (2013.01); *B60L 2240/36* (2013.01); *B64C 2201/027* (2013.01); *B64C 2201/18* (2013.01)

(58) Field of Classification Search
CPC .......... B64F 1/364; B64F 1/222; B64F 1/007; B64F 1/362; B60J 7/043; B60L 53/57; B60L 2240/36; B64C 2201/027; B64C 2201/18; B64C 39/024; B64C 2201/042; B64C 2201/208; Y02T 10/70
USPC ......................................................... 454/76
See application file for complete search history.

(56) References Cited

U.S. PATENT DOCUMENTS

| | | | |
|---|---|---|---|
| 6,739,742 B2 * | 5/2004 | Gehring | B60Q 3/225 |
| | | | 362/490 |
| 7,248,018 B2 * | 7/2007 | Sanders, Jr | H02S 40/38 |
| | | | 320/109 |
| 10,023,326 B2 | 7/2018 | Byers et al. | |
| 10,183,563 B2 * | 1/2019 | Rayner | B62K 27/003 |
| 10,207,820 B2 * | 2/2019 | Sullivan | B64F 3/00 |
| 10,322,823 B2 * | 6/2019 | Tengman | B64F 1/364 |
| 10,676,216 B2 * | 6/2020 | Chan | B64F 5/60 |
| 10,759,286 B2 * | 9/2020 | Evans | B61B 3/02 |
| 10,882,410 B2 * | 1/2021 | Renold | B60L 53/35 |

(Continued)

FOREIGN PATENT DOCUMENTS

| | | | | |
|---|---|---|---|---|
| CN | 207450282 U | * | 6/2018 | ............ B64D 47/08 |
| CN | 209142410 U | * | 7/2019 | ............ B64D 43/00 |

(Continued)

*Primary Examiner* — M Baye Diao
(74) *Attorney, Agent, or Firm* — Vichit Chea; Carlson, Gaskey & Olds, P.C.

(57) ABSTRACT

This disclosure details exemplary moonroof systems for vehicles. An exemplary moonroof system may include a pod assembly that may be received within an opening of a headliner. The pod assembly may be utilized to dock, deploy, and land an unmanned aerial vehicle relative to the moonroof system. The pod assembly may include a charging and cooling system for charging and cooling the unmanned aerial vehicle when it is docked within the pod assembly.

20 Claims, 7 Drawing Sheets

(56) References Cited

U.S. PATENT DOCUMENTS

| | | | |
|---|---|---|---|
| 10,946,964 B2* | 3/2021 | Thrun | H01M 50/249 |
| 11,332,265 B2* | 5/2022 | Guo | B64C 39/024 |
| 2008/0100100 A1* | 5/2008 | Huisman | B60R 13/0231 |
| | | | 29/897 |
| 2017/0113815 A1 | 4/2017 | James et al. | |
| 2018/0229860 A1* | 8/2018 | Clermont | B64F 1/228 |
| 2020/0244087 A1* | 7/2020 | Yang | B64D 45/08 |
| 2020/0290752 A1* | 9/2020 | Kolosiuk | B60L 53/16 |
| 2020/0406773 A1* | 12/2020 | Lacaze | B64F 1/364 |
| 2021/0070444 A1* | 3/2021 | Werner | B64C 21/02 |

FOREIGN PATENT DOCUMENTS

| | | | | |
|---|---|---|---|---|
| DE | 102017102470 A1 | | 8/2018 | |
| EP | 3348477 A1 | | 7/2018 | |
| FR | 2631109 A | * | 11/1989 | F41G 3/22 |
| WO | WO-2017157863 A1 | * | 9/2017 | B60P 3/11 |
| WO | WO-2018077298 A1 | * | 5/2018 | B64F 1/00 |

\* cited by examiner

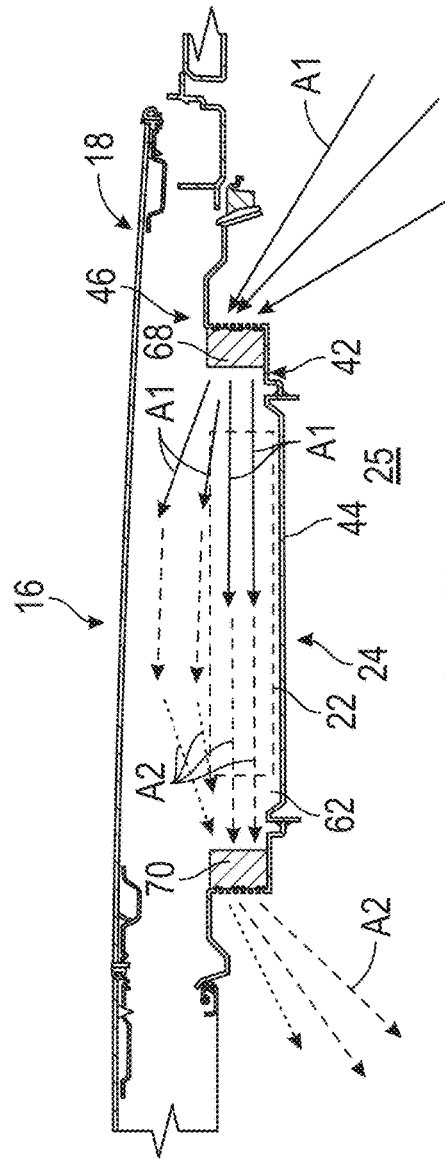
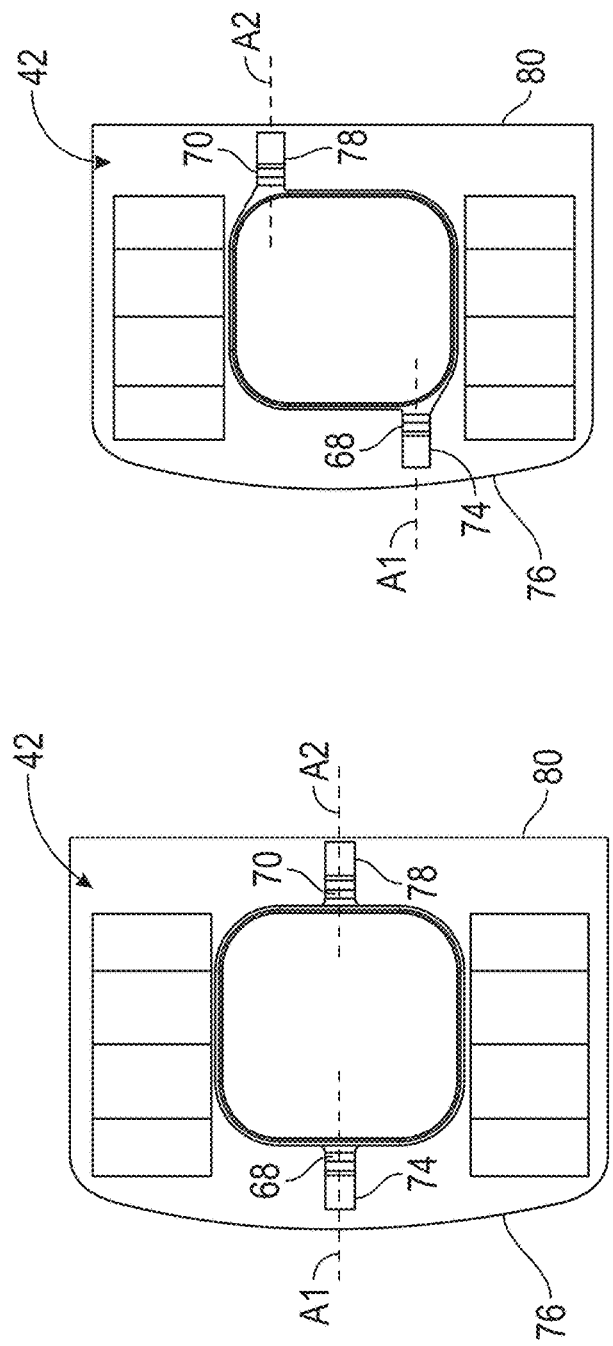
FIG. 12
FIG. 13
FIG. 14

VEHICLE MOONROOF SYSTEMS FOR DOCKING AND COOLING UNMANNED AERIAL VEHICLES

TECHNICAL FIELD

This disclosure relates to vehicle moonroof systems that include pod assemblies for docking and cooling unmanned aerial vehicles.

BACKGROUND

Vehicles may include a roof having an opening. A movable closure panel, often referred to as a moonroof, can selectively open or close the opening. Some vehicle users may wish to deploy unmanned aerial vehicles (e.g., drones) from the vehicle.

SUMMARY

A moonroof system according to an exemplary aspect of the present disclosure includes, among other things, a pod assembly including a base, and a hatch movably connected to the base. The base and the hatch establish a recessed compartment configured for docking an unmanned aerial vehicle within the pod assembly.

In a further non-limiting embodiment of the foregoing moonroof system, the pod assembly includes a charging and cooling system configured to charge or cool the unmanned aerial vehicle when the unmanned aerial vehicle is docked within the pod assembly.

In a further non-limiting embodiment of either of the foregoing moonroof systems, the charging and cooling system is configured to cool the unmanned aerial vehicle when a temperature within the pod assembly is greater than or equal to a first temperature threshold and is configured to charge the unmanned aerial vehicle when the temperature within the pod assembly is less than or equal to a second temperature threshold.

In a further non-limiting embodiment of any of the foregoing moonroof systems, the charging and cooling system includes a thermocouple adapted to sense the temperature, and a relay adapted to switch an output of a rechargeable battery of the charging and cooling system.

In a further non-limiting embodiment of any of the foregoing moonroof systems, the charging and cooling system includes a first fan configured to drawn an airflow into the pod assembly and a second fan configured to vent the airflow out of the pod assembly.

In a further non-limiting embodiment of any of the foregoing moonroof systems, the first fan is positioned within a first pocket of the base and the second fan is positioned within a second pocket of the base.

In a further non-limiting embodiment of any of the foregoing moonroof systems, the first pocket is laterally offset from the second pocket.

In a further non-limiting embodiment of any of the foregoing moonroof systems, the charging and cooling system includes a photovoltaic module that is configured to charge a rechargeable battery.

In a further non-limiting embodiment of any of the foregoing moonroof systems, the hatch includes an airflow deflector configured for diverting airflow within the pod assembly.

In a further non-limiting embodiment of any of the foregoing moonroof systems, the hatch includes a finger release tab for disconnecting the hatch from the base.

In a further non-limiting embodiment of any of the foregoing moonroof systems, a headliner includes an opening, and the pod assembly is positioned within the opening.

In a further non-limiting embodiment of any of the foregoing moonroof systems, the pod assembly includes a mount tab that is received over a section of a peripheral structure of the headliner.

A vehicle according to another exemplary aspect of the present disclosure includes, among other things, a roof including a first opening, a headliner attached at an interior surface of the roof and including a second opening aligned with the first opening, and a drone pod assembly received within the second opening. The drone pod assembly includes a base and a hatch connected to the base. A closure panel is movable to cover or uncover the first opening.

In a further non-limiting embodiment of the foregoing vehicle, the vehicle is a pickup truck or a sport utility vehicle.

In a further non-limiting embodiment of either of the foregoing vehicles, the drone pod assembly includes a charging and cooling system configured to charge or cool a drone when the drone is docked within the drone pod assembly.

In a further non-limiting embodiment of any of the foregoing vehicles, the charging and cooling system includes a photovoltaic module, a rechargeable battery, a fan, and a control system.

In a further non-limiting embodiment of any of the foregoing vehicles, the control system includes a controller, a thermocouple, and a relay.

In a further non-limiting embodiment of any of the foregoing vehicles, the thermocouple is adapted to sense a temperature within the pod assembly, and the controller is adapted to control a position of the relay based on the temperature.

In a further non-limiting embodiment of any of the foregoing vehicles, in response to a first temperature, the controller commands the relay to a first position in which a drone is charged by the rechargeable battery, and in response to a second temperature, the controller commands the relay to a second position in which the fan is powered by the rechargeable battery.

In a further non-limiting embodiment of any of the foregoing vehicles, a shade is movable to either permit or allow sunlight from entering into a passenger cabin of the vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 12 is a cross-sectional view of a vehicle moonroof system and schematically illustrates operation of a cooling system of a pod assembly of the moonroof system.

FIG. 13 illustrates a first fan configuration of a cooling system of a vehicle moonroof system.

FIG. 14 illustrates a second fan configuration of a cooling system of a vehicle moonroof system.

DETAILED DESCRIPTION

This disclosure details exemplary moonroof systems for vehicles. An exemplary moonroof system may include a pod assembly that may be received within an opening of a headliner. The pod assembly may be utilized to dock, deploy, and land an unmanned aerial vehicle relative to the moonroof system. The pod assembly may include a charging and cooling system for charging and cooling the unmanned aerial vehicle when it is docked within the pod assembly. These and other features of this disclosure are described in greater detail in the following paragraphs of this detailed description.

Figure 1:
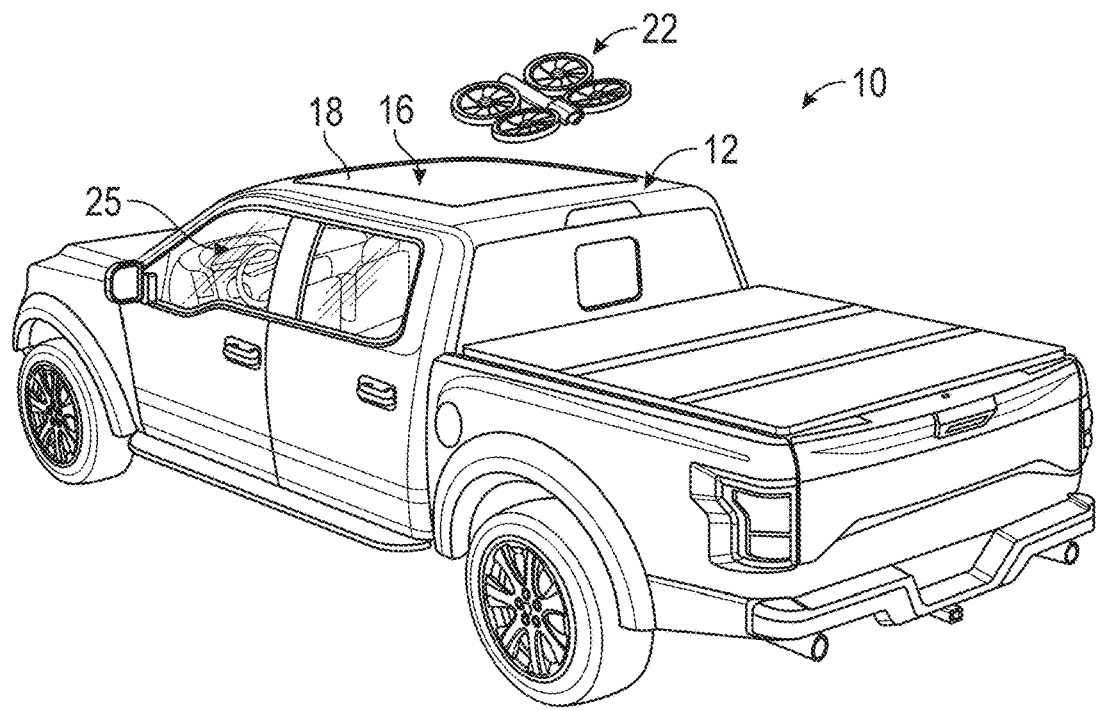
FIG. 1 illustrates a vehicle equipped with a moonroof system. A user may wish to land an unmanned aerial vehicle on the vehicle or deploy the unmanned aerial vehicle from the vehicle.
Figure 2:
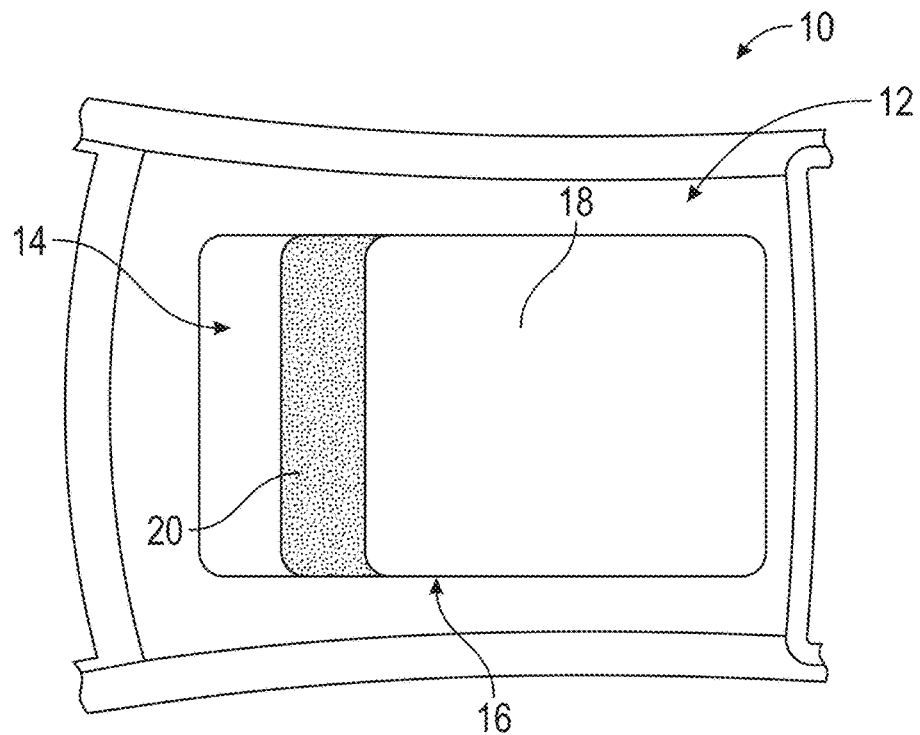
FIG. 2 is a top view of the moonroof system of the vehicle of FIG. 1.
Figure 3:
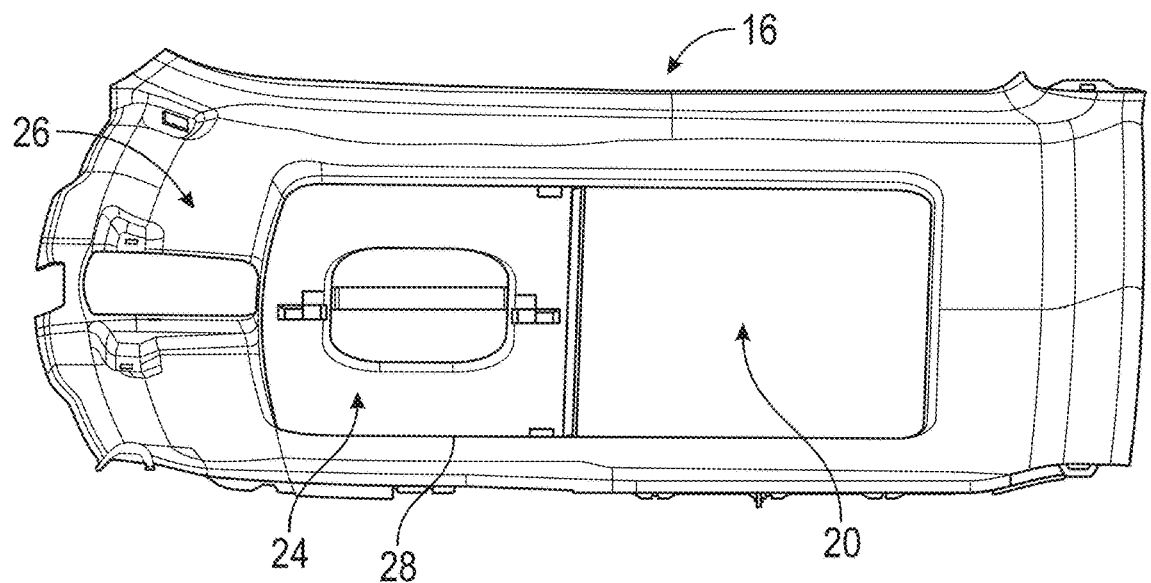
FIG. 3 illustrates a headliner of a vehicle moonroof system.

FIGS. 1 and 2 illustrate a vehicle 10 that includes a roof 12 having an opening 14. The vehicle 10 may also include a moonroof system 16 that is positioned within the opening 14. The moonroof system 16 may include a closure panel 18, sometimes referred to simply as a moonroof, and a shade 20. The closure panel 18 and the shade 20 may be moved to various positions independently relative to each other and relative to the opening 14. In some of the positions, the closure panel 18 can partially close the opening 14, as shown in FIG. 2. In other positions, the closure panel 18 can completely close the opening 14, as shown in FIG. 1. The shade 20 can be moved to either allow or block sunlight from entering into a passenger cabin 25 of the vehicle 10.

In the illustrated embodiment, the vehicle 10 is a pickup truck. While a pickup truck is specifically pictured and referenced herein, other vehicles could also benefit from the teachings of this disclosure. For example, the exemplary moonroof systems of this disclosure could also be utilized within cars, vans, sport utility vehicles, or any other type of motor vehicle.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

An owner, operator, or user of the vehicle 10 may desire to deploy an unmanned aerial vehicle (UAV) 22 (e.g., a drone) from the vehicle 10 or land the UAV 22 on the vehicle 10. In an embodiment, the UAV 22 may be deployed/landed relative to the vehicle 20 from within the moonroof system 16. Vehicle moonroof systems that include novel pod assemblies for docking, deploying, landing, and cooling UAVs are therefore proposed in this disclosure.

Referring to FIGS. 3-6, with continued reference to FIGS. 1-2, the moonroof system 16 may additionally include a pod assembly 24 and a headliner 26. The pod assembly 24 is a modular unit that may be received within an opening 28 of the headliner 26 when the shade 20 is moved to at least a partially open position. The pod assembly 24 may be utilized to dock the UAV 22 on the vehicle 10, deploy the UAV 22 from the vehicle 10, or land the UAV 22 on the vehicle 10. In particular, the pod assembly 24 enables the UAV 22 to be deployed/landed from a position within the moonroof system 16, and thus the UAV 22 can be deployed/landed through the opening 14 of the roof 12.

The headliner 26 of the moonroof system 16 may be attached to an interior side of the roof 12 and partially surrounds the closure panel 18 to provide an attractive appearance from within the passenger cabin 25 of the vehicle 10. Once attached to the interior side of the roof 12, the opening 28 of the headliner 26 aligns with the opening 14 of the roof 12 to provide an open air experience when the closure panel 18 is moved to an open position.

The pod assembly 24 is supported within the opening 28 by a peripheral structure of the headliner 26. The peripheral structure of the headliner 26 may include a front lateral rail section 30, a rear lateral rail section 32, and a pair of longitudinal rails sections 34 that extend between the front lateral rail section 30 and the rear lateral rail section 32 at opposite sides of the peripheral structure.

Figure 4:
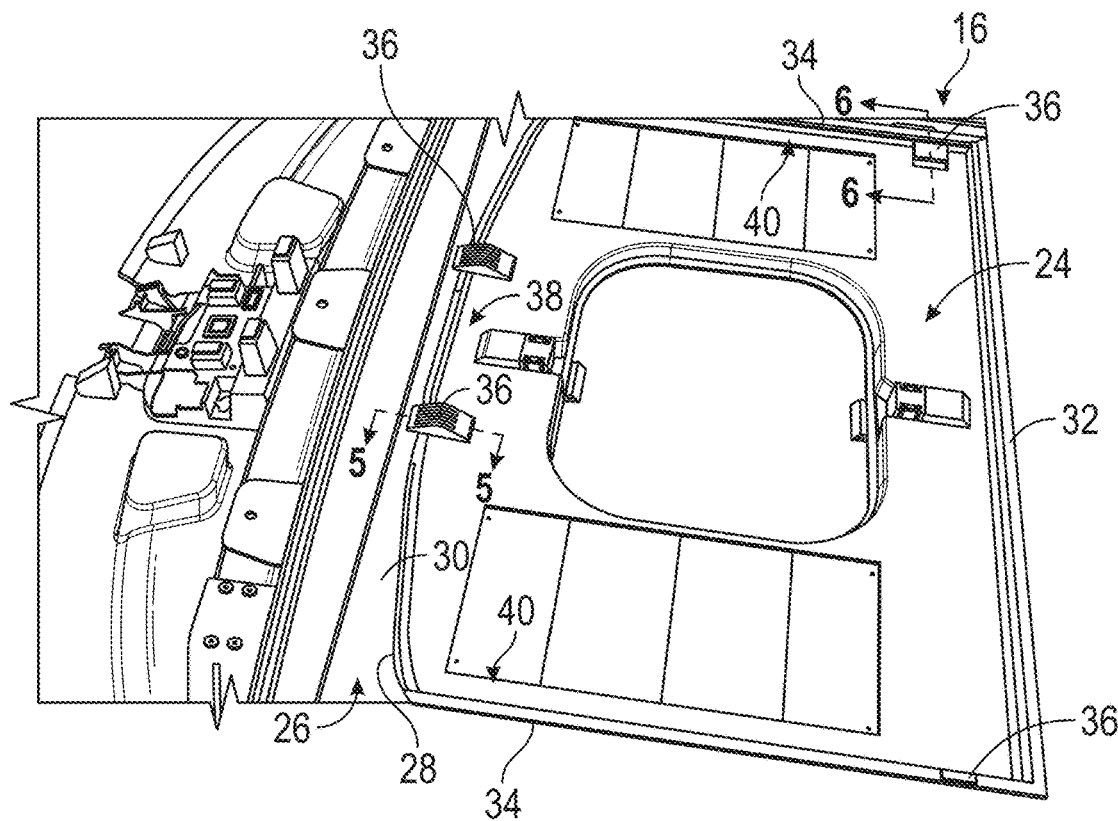
FIG. 4 illustrates a pod assembly of the moonroof system when received within an opening established by the headliner of FIG. 3.
Figure 5:
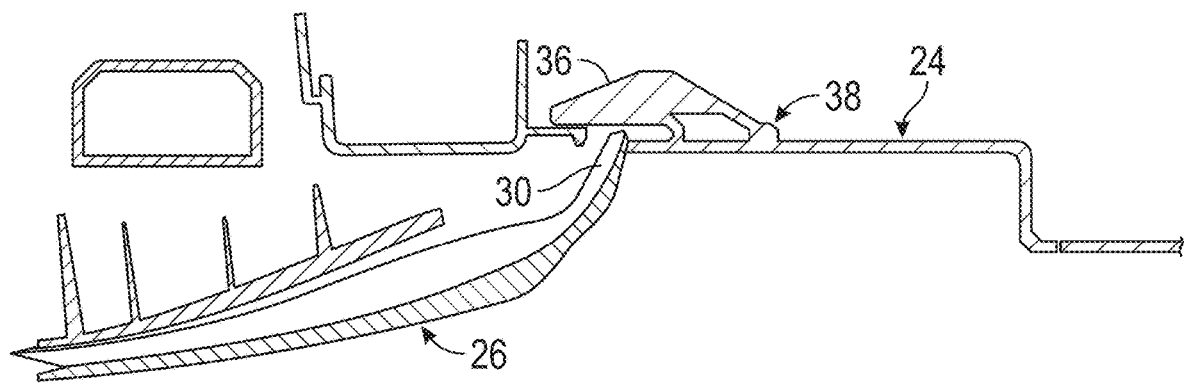
FIG. 5 is a cross-sectional view through section 5-5 of FIG. 4.
Figure 6:
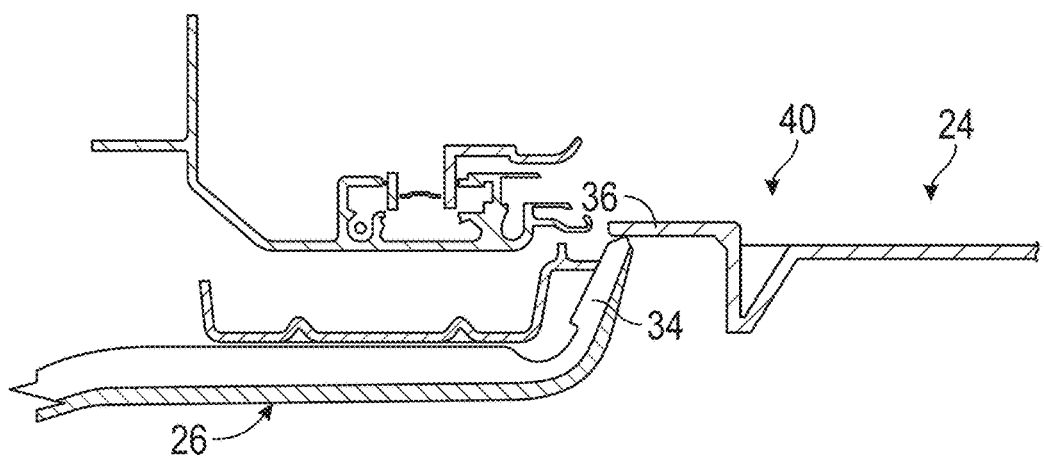
FIG. 6 is a cross-sectional view through section 6-6 of FIG. 4.
Figure 7:
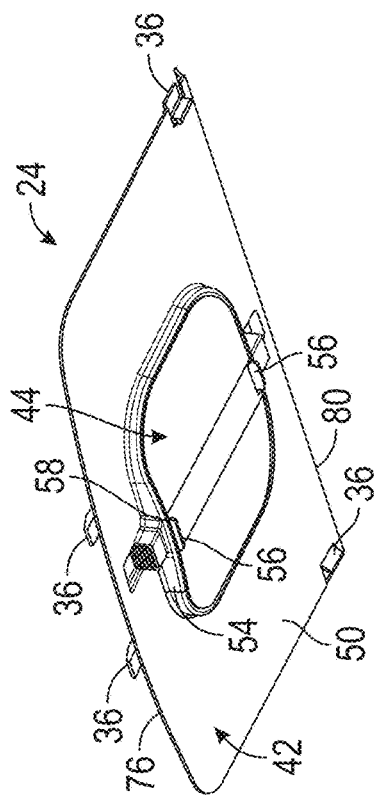
FIG. 7 is a top view of a pod assembly of a vehicle moonroof system.
Figure 8:
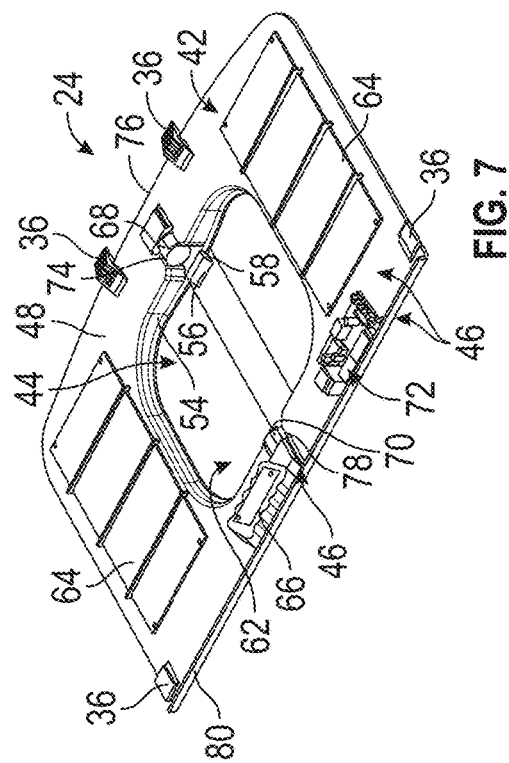
FIG. 8 is a bottom view of the pod assembly of FIG. 7.
Figure 9:
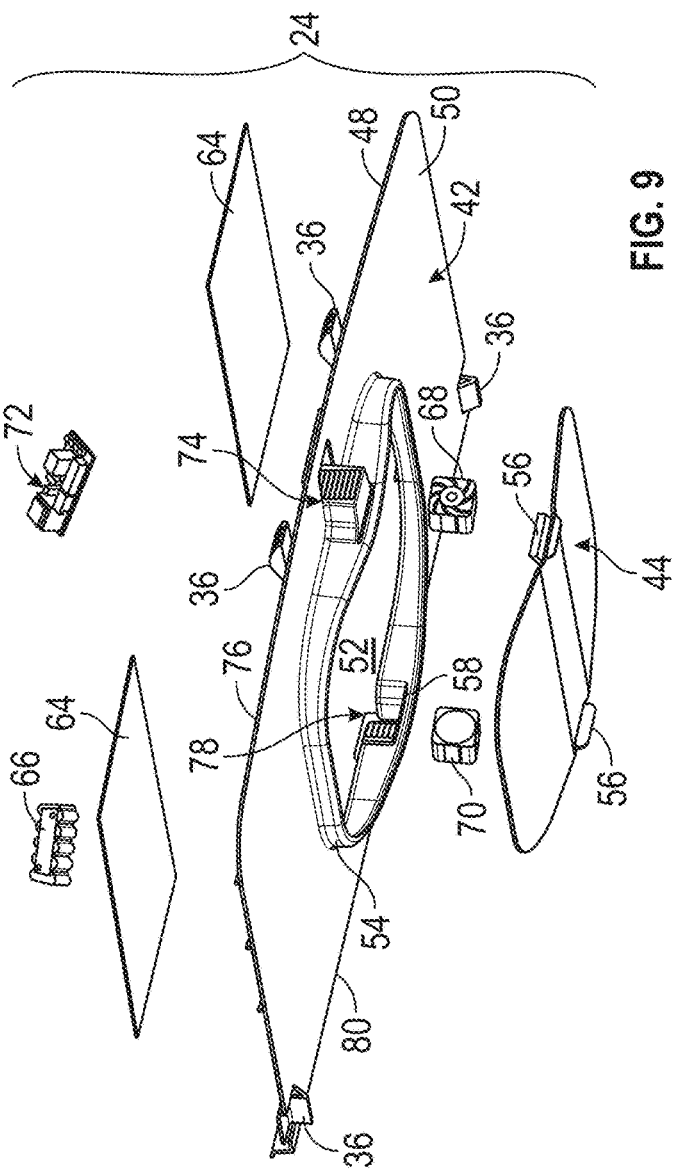
FIG. 9 is an exploded view of the pod assembly of FIG. 7.
Figure 10:
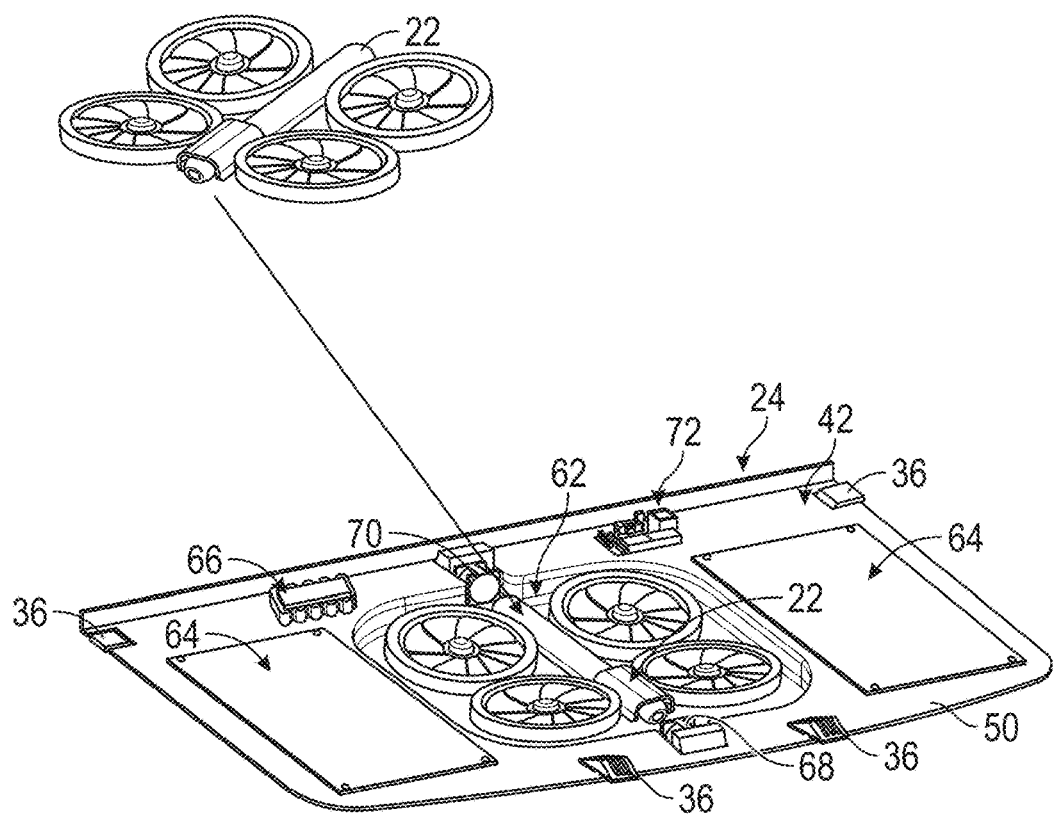
FIG. 10 illustrates an unmanned aerial vehicle docked within the pod assembly of FIGS. 7-9.
Figure 11:
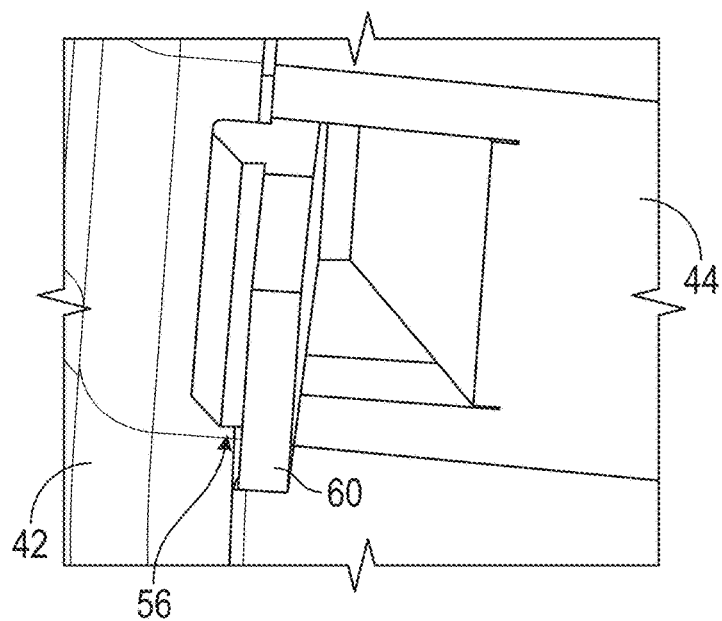
FIG. 11 illustrates a finger release tab for establishing a connection between a base and a hatch of a pod assembly of a vehicle moonroof system.

The pod assembly 24 may include a plurality of mount tabs 36 for supporting the pod assembly 24 within the opening 28 of the headliner 26 and for preventing the pod assembly 24 from falling through the opening 28. In an embodiment, a front section 38 of the pod assembly 24 includes a pair of mount tabs 36, and each opposing side 40 of the pod assembly 24 includes one or more mount tabs 36. Other mounting tab configurations than the ones shown in FIGS. 4-6 are also contemplated within the scope of this disclosure. The mount tabs 36 of the front section 38 of the pod assembly 24 may be received over the front lateral rail section 30 of the headliner (see FIG. 5), and the mounts tabs 36 of each side 40 of the pod assembly 24 may be received over one of the longitudinal rail sections 34 of the pod assembly 24 (see FIG. 6), thereby supporting the pod assembly 24 within the opening 28.

FIGS. 7-11 further illustrate the exemplary pod assembly 24 of the moonroof system 16 described above. The pod assembly 24 may include a base 42, a hatch 44, and a charging and cooling system 46. Each of these components/systems is further detailed below.

The base 42 of the pod assembly 24 may be sized and shaped to be received within the opening 28 of the headliner 26. The size and shape of the base 42 are in no way intended to limit this disclosure. The base 42 includes a top surface 48 and a bottom surface 50.

A through opening 52 (see FIG. 9) may be formed through the base 42. The through opening 52 therefore penetrates through both the top surface 48 and the bottom surface 50 of the base 42. A lip 54 may protrude from the bottom surface 50 of the base 42 and may circumscribe the through opening 52.

The various mount tabs 36 may extend from the top surface 48 of the base 42. In an embodiment, the mount tabs 36 are integrally molded features of the base 42.

The hatch 44 may be connected to the base 42, and in an embodiment, is removably connected to the base 42. For example, the hatch 44 can be removed from the base 42 by a user who is positioned inside the passenger cabin 25 of the vehicle 10. The UAV 22 can therefore be loaded into or removed from the pod assembly 24 from inside the vehicle 10.

The hatch 44 may include a pair of finger release tabs 56 for releasing the hatch 44 from the base 42. The finger release tabs 56 may engage a recess 58 formed in the lip 54 of the base 42 to attach the hatch 44 to the base 42. A base extension 60 of the finger release tabs 56 (best shown in FIG. 11) may be pushed or otherwise manipulated to release the finger release tabs 56 from the recesses 58 and allow the hatch 44 to be lowered down away from the base 42. Other attachment mechanisms, including hinges, clam shell doors, etc. may be employed for removably or movably securing the hatch 44 relative to the base 42.

A recessed compartment 62 is established when the hatch 44 is connected to the base 42. The UAV 22 may be docked within the recessed compartment 62 (see, e.g., FIG. 10).

The UAV 22 may include a power source that operates best when kept within a suitable temperature range. However, due to the location of the pod assembly 24 within the moonroof system 16, the UAV 22 may be susceptible to direct sun load conditions that could potentially overheat the power source of the UAV 22. The charging and cooling system 46 of the pod assembly 24 may therefore be configured to either charge or cool the UAV 22 when it is docked within the recessed compartment 62 of the pod assembly 24, depending on the surface temperatures of the moonroof system 16. In an embodiment, the charging and cooling system 46 includes one or more photovoltaic modules 64, a rechargeable battery 66, a first fan 68, a second fan 70, and a control system 72.

In an embodiment, two photovoltaic modules 64 are mounted to the top surface 48 of the base 42 of the pod assembly 24, with one photovoltaic module 64 being mounted on each side of the through opening 52. However, one or more photovoltaic modules 64 could be employed for use within the charging and cooling system 46. The photovoltaic modules 64 may be referred to as solar panels or solar arrays. The photovoltaic modules 64 can capture and utilize solar energy from the sun. For example, the energy captured by the photovoltaic modules 64 can be used to charge the rechargeable battery 66. Since the closure panel 18 of the moonroof system 16 is made of transparent glass, the photovoltaic modules 64 may capture the solar energy from the sun even when the closure panel 18 is in a position in which the opening 14 of the roof is closed. Further, the closure panel 18 can be closed over top of the pod assembly 24, even when the UAV 22 is docked therein.

The rechargeable battery 66 may also be mounted to the top surface 48 of the base 42 of the pod assembly 24. The energy stored in the rechargeable battery 66 may be used to either charge the UAV 22 or to power the first and second fans 68, 70 in order to cool the UAV 22. In an embodiment, the rechargeable battery 66 is a low voltage battery having a voltage between 5 V and 12 V.

The first fan 68, which may be referred to as an intake fan, may be mounted within a first pocket 74 formed in the base 42 of the pod assembly 24. The first pocket 74 may be formed near a front edge 76 of the base 42 and may extend from the top surface 48 toward the bottom surface 50 but without penetrating through the bottom surface 50. The first pocket 74 may also open through the lip 54 of the base 42 such that the first pocket 74 opens into the through opening 52.

The second fan 70, which may be referred to as a vent fan, may be mounted within a second pocket 78 formed in the base 42 of the pod assembly 24. The second pocket 78 may be formed near a rear edge 80 of the base 42 and may extend from the top surface 48 toward the bottom surface 50 but without penetrating through the bottom surface 50. The second pocket 78 may also open through the lip 54 of the base 42 such that the second pocket 78 opens into the through opening 52.

The control system 72 may control the operation of the charging and cooling system 46 of the pod assembly 24. The control system 72 may include a controller (see, e.g., feature 86 of FIG. 16) and various other electronics. The control system 72 may include hardware and software, and could be part of an overall vehicle control module, such as a vehicle system controller (VSC), or could alternatively be a stand-alone controller separate from the VSC. Further, the control system 72 may be programmed with executable instructions for interfacing with and operating the various components of the charging and cooling system 46. Each controller of the control system 72 may include a processing unit and non-transitory memory for executing the various control strategies and modes of the charging and cooling system 46.

FIG. 12 schematically illustrates an exemplary operation of the charging and cooling system 46 when operating to cool the UAV 22 that is docked within the pod assembly 24. During this operation, the first fan 68 and the second fan 70 may be powered by the rechargeable battery 66 (not shown in FIG. 12, see FIG. 16). The first fan 68 draws in relatively cool air A1 from the passenger cabin 25 of the vehicle 10 and distributes the cool air A1 around the UAV 22 and throughout the recessed compartment 62 of the pod assembly 24. As the air A1 is drawn through the pod assembly 24, it picks up heat from the UAV 22 and the pod assembly 24 and therefore becomes heated air A2. The heated air A2 may then be vented back into the passenger cabin 25 by the second fan 70.

Once returned to the passenger cabin 25, the heated air A2 may be cooled again by the HVAC system of the vehicle 10 when the vehicle 10 is operating. However, even when the vehicle 10 is not operating, the first and second fans 68, 70 may be operated in order to circulate airflow through the pod assembly 24 and achieve a thermal conditioning effect on the UAV 22.

The airflow that passes through the pod assembly 24 may also cool the photovoltaic modules 64 and/or the electronics of the control system 72. Furthermore, the airflow may disperse dust and other debris that could otherwise accumulate within the pod assembly 24.

The relative positions between the first fan 68 and the second fan 70 can affect the airflow and air velocity of the airflow that is communicated through the pod assembly 24. Therefore, the first fan 68 and the second fan 70 can be positioned at different locations relative to one another in order to optimize the airflow and air velocity.

In a first embodiment, shown in FIG. 13, the first pocket 74 that receives the first fan 68 is substantially aligned with the second pocket 78 that receives the second fan 70. In this way, a first longitudinal axis A1 passing through the first pocket 74 (in a direction that extends from the front edge 76 toward the rear edge 80 of the base 42) may lie in a common plane with a second longitudinal axis A2 passing through the second pocket 78.

In a second embodiment, shown in FIG. 14, the first pocket 74 that receives the first fan 68 is laterally offset from the second pocket 78 that receives the second fan 70. In this way, the first longitudinal axis A1 passing through the first pocket 74 lies in a different plane than the second longitudinal axis A2 passing through the second pocket 78.

Figure 15:
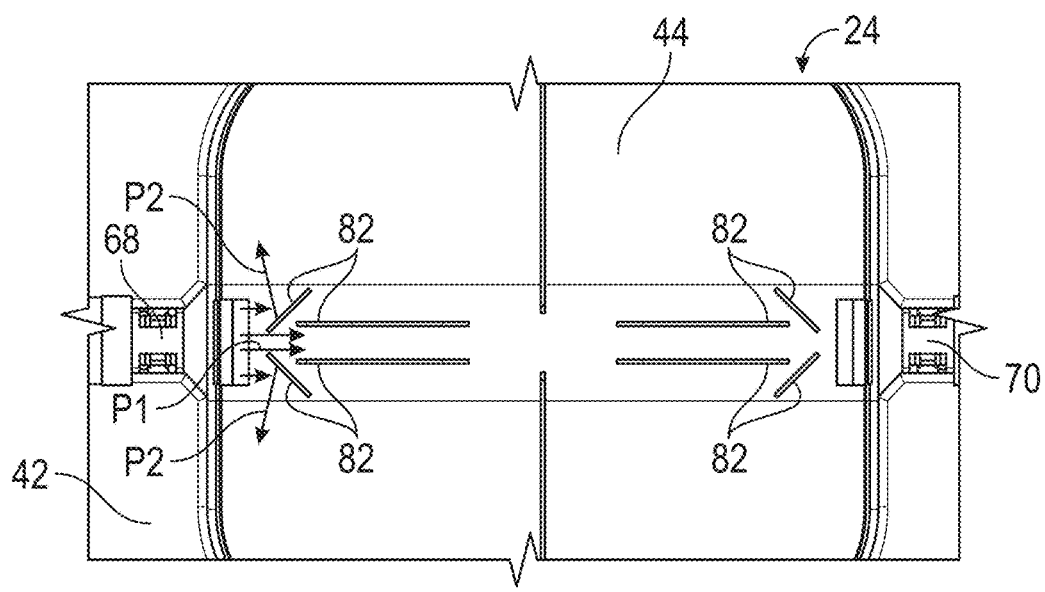
FIG. 15 illustrates an exemplary configuration of airflow deflectors for guiding airflow throughout a pod assembly of a vehicle moonroof system.

The pod assembly 24 may include additional features for improving the flow of cooling airflow through the pod assembly 24 when attempting to cool a UAV 22 docked therein. For example, as shown in FIG. 15, the hatch 44 of the pod assembly 24 may include one or more airflow deflectors 82 for controlling the flow of the cooling airflow. In an embodiment, the airflow deflectors 82 are arranged to allow a first portion P1 of the cooling airflow communicated by the first fan 68 to cool the UAV 22 and to allow a second portion P2 of the airflow to be deflected outwardly and disperse for cooling the surrounding airflow within the pod assembly 24. The airflow deflectors 82 may therefore help to cool the pod assembly 24 and the UAV 22 more quickly and efficiently. In an embodiment, the airflow deflectors 82 are integrally molded features of the hatch 44.

Figure 16:
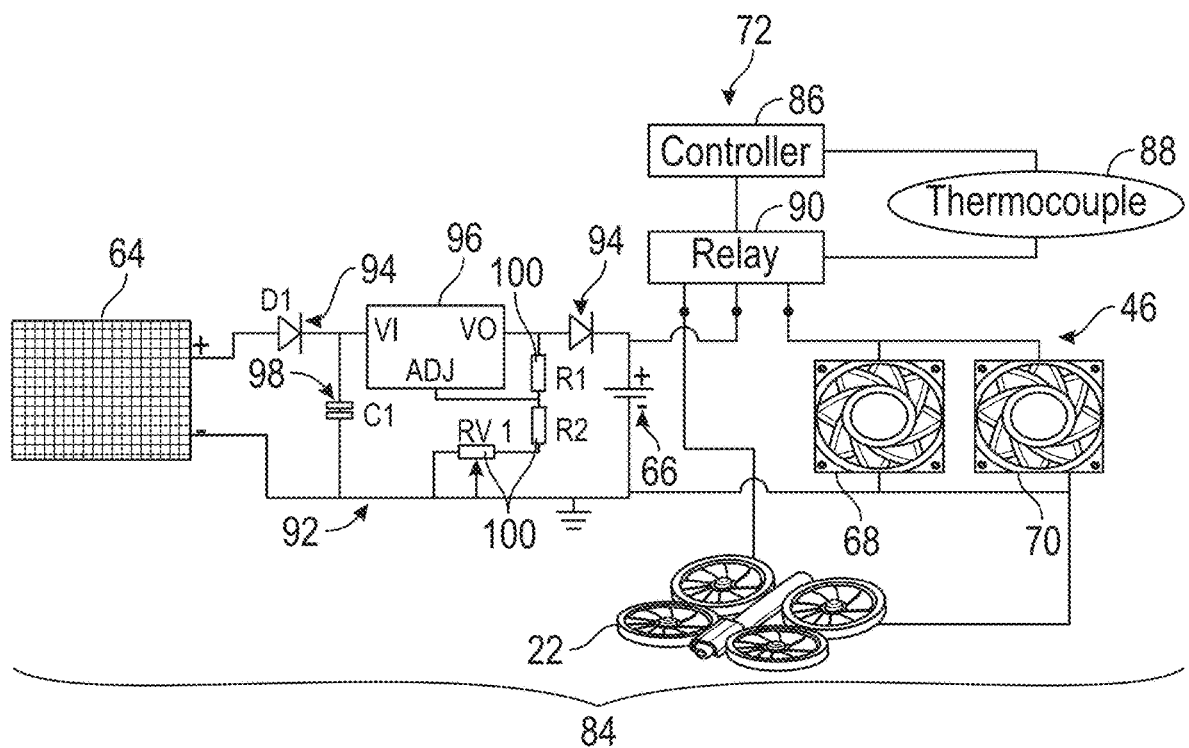
FIG. 16 is an electrical circuit diagram for charging and cooling an unmanned aerial vehicle when docked within a pod assembly of a vehicle moonroof system.

FIG. 16 is an electrical circuit diagram 84 for the charging and cooling system 46 of the pod assembly 24. As depicted in this embodiment, the control system 72 of the charging and cooling system 46 may include a controller 86, a thermocouple 88, and a relay 90. In a default position of the relay 90, the first and second fans 68, 70 are turned OFF and the power from the rechargeable battery 66, which may be charged by the photovoltaic module 64, is used to charge the power source of the UAV 22.

The thermocouple 88 may be electrically connected to the controller 86 and may monitor a temperature within the pod assembly 24, such as a current temperature within the recessed compartment 62 where the UAV 22 is docked. When the temperature sensed by the thermocouple 88 is greater than or equal to a predefined temperature threshold (e.g., 65 degrees C./149 degrees F.), the controller 86 may command the relay 90 to turn the first and second fans 68, 70 ON in order to cool the UAV 22. The relay 90 will therefore switch the output from the rechargeable battery 66 to be directed to power the first and second fans 68, 70 rather than the power source of the UAV 22.

Subsequently, when the temperature sensed by the thermocouple 88 is less than or equal to a second temperature threshold that is considered an acceptable temperature (e.g., 60 degrees C./140 degrees F.), the controller 86 may command the relay 90 to turn the first and second fans 68, 70 back OFF and then switch the system back to charging the power source of the UAV 22. Using the above procedure, the charging and cooling system 46 may maintain the power source of the UAV 22 within acceptable operating temperatures.

A circuit 92 may be disposed between the photovoltaic module 64 and the rechargeable battery 66. The circuit 92 may include numerous electrical components, including but not limited to, diodes 94, a voltage regulator 96, a capacitor 98, and resistors 100. These components of the circuit 92 control the flow of current from the photovoltaic module 64 to the rechargeable battery 66 for charging the rechargeable battery 66.

The vehicle moonroof systems of this disclosure include modular pod assemblies that provide the ability to easily dock and deploy unmanned aerial vehicles from within vehicles. The pod assemblies can be employed for use across various vehicle lines, including on various pickup truck and sport utility vehicle lines. The unique features of the exemplary pod assembly allow users to load and unload the unmanned aerial vehicle from inside the vehicle, allow for charging the unmannered aerial vehicle when docked, and allow for cooling the unmanned aerial vehicle when temperatures exceed a predefined temperature threshold.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A moonroof system, comprising:
   a moonroof closure panel movable between a closed position and an open position; and
   a pod assembly including:
      a base; and
      a hatch movably connected to the base,
      wherein the base and the hatch establish a recessed compartment configured for docking an unmanned aerial vehicle within the pod assembly,
      wherein, when in the closed position, the moonroof closure panel is arranged to cover the recessed compartment.

2. The moonroof system as recited in claim 1, wherein the hatch includes an airflow deflector configured for diverting airflow within the pod assembly.

3. The moonroof system as recited in claim 1, wherein the hatch includes a finger release tab for disconnecting the hatch from the base.

4. The moonroof system as recited in claim 1, comprising a headliner that includes an opening, and the pod assembly is positioned within the opening.

5. The moonroof system as recited in claim 4, wherein the pod assembly includes a mount tab that is received over a section of a peripheral structure of the headliner.

6. A moonroof system, comprising:
   a pod assembly including:
      a base; and
      a hatch movably connected to the base,
      wherein the base and the hatch establish a recessed compartment configured for docking an unmanned aerial vehicle within the pod assembly; and
      wherein the pod assembly includes a charging and cooling system configured to charge or cool the unmanned aerial vehicle when the unmanned aerial vehicle is docked within the pod assembly.

7. The moonroof system as recited in claim 6, wherein the charging and cooling system is configured to cool the unmanned aerial vehicle when a temperature within the pod assembly is greater than or equal to a first temperature threshold and is configured to charge the unmanned aerial vehicle when the temperature within the pod assembly is less than or equal to a second temperature threshold.

8. The moonroof system as recited in claim 7, wherein the charging and cooling system includes a thermocouple adapted to sense the temperature and a relay adapted to switch an output of a rechargeable battery of the charging and cooling system.

9. The moonroof system as recited in claim 6, wherein the charging and cooling system includes a first fan configured to drawn an airflow into the pod assembly and a second fan configured to vent the airflow out of the pod assembly.

10. The moonroof system as recited in claim 9, wherein the first fan is positioned within a first pocket of the base and the second fan is positioned within a second pocket of the base.

11. The moonroof system as recited in claim 10, wherein the first pocket is laterally offset from the second pocket.

12. The moonroof system as recited in claim 6, wherein the charging and cooling system includes a photovoltaic module that is configured to charge a rechargeable battery.

13. A vehicle, comprising:
a roof including a first opening;
a headliner attached at an interior surface of the roof and including a second opening aligned with the first opening;
a drone pod assembly received within the second opening, wherein the drone pod assembly includes a base and a hatch connected to the base; and
a closure panel movable to cover or uncover the first opening.

14. The vehicle as recited in claim 13, wherein the vehicle is a pickup truck or a sport utility vehicle.

15. The vehicle as recited in claim 13, wherein the drone pod assembly includes a charging and cooling system configured to charge or cool a drone when the drone is docked within the drone pod assembly.

16. The vehicle as recited in claim 15, wherein the charging and cooling system includes a photovoltaic module, a rechargeable battery, a fan, and a control system.

17. The vehicle as recited in claim 16, wherein the control system includes a controller, a thermocouple, and a relay.

18. The vehicle as recited in claim 17, wherein the thermocouple is adapted to sense a temperature within the pod assembly, and the controller is adapted to control a position of the relay based on the temperature.

19. The vehicle as recited in claim 18, wherein, in response to a first temperature, the controller commands the relay to a first position in which a drone is charged by the rechargeable battery, and wherein, in response to a second temperature, the controller commands the relay to a second position in which the fan is powered by the rechargeable battery.

20. The vehicle as recited in claim 13, comprising a shade movable to either permit or allow sunlight from entering into a passenger cabin of the vehicle.

* * * * *